2,849,475
DIESTERS OF DITHIOPHOSPHORIC ACID

Joseph Emmett Carpenter, Greenwich, Conn., assignor to American Cyanamid Company, New York, N. Y., a corporation of Maine No Drawing. Application April 4, 1956
Serial No. 575,980

9 Claims. (Cl. 260—461)

This invention relates to a new and novel process for preparing diesters of dithiophosphoric acid in which the ester groups are different and to novel products produced thereby. More particularly, it relates to the transesterification of a lower aliphatic diester of a dithiophosphoric acid having the same ester groupings with a diverse monohydric or polyhydric alcohol to obtain useful products which may be represented by either of the general formulas:

(1)

or

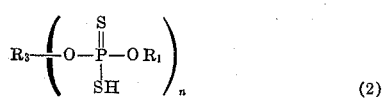

(2)

In these formulas, $R_1$ is a radical derived from a lower monohydric aliphatic alcohol containing from 1 to 6 carbon atoms; $R_2$ is a radical containing from 7 to 30 carbon atoms and derived from either a monohydric aliphatic alcohol or a monohydric araliphatic alcohol; $R_3$ is a radical derived from an aliphatic polyhydric alcohol containing "$n$" hydroxyl groups where "$n$" is 2, 3 or 4.

Certain mixed dithiophosphoric diesters are known. These have been prepared by the reaction of a mixture of two dissimilar alcohols and phosphorous pentasulfide ($P_2S_5$) at temperatures above about 50° C. For example, it is known that when a mixture of methanol and heptanol is reacted with phosphorous pentasulfide at about 70° C., a reaction product consisting of O,O-dimethyl dithiophosphoric acid, O,O-diheptyl dithiophosphoric acid and O-methyl-O-heptyl dithiophosphoric acid is obtained. However, such mixtures are very difficult to separate into their components. They are also highly colored. Furthermore, the known method for their preparation cannot be used, particularly where one of the alcohols is a secondary alcohol. This is because the temperature which is required to cause the phosphorous pentasulfide to react is higher than the temperature at which the dithiophosphoric acid will decompose. The usual method of preparation is therefore not satisfactory, where it is desired to obtain as a principal product a mixed diester of one of the Formulas 1 or 2 given above.

It is, therefore, a principal object of the invention to provide a commercially feasible process for preparing diesters of dithiophosphoric acids having dissimilar ester groups as the principal product. It is a further object of the invention to provide a novel group of diesters of dithiophosphoric acid within the scope of the general Formula 2 above when "$n$" is two.

These, and other objects, are attained in a surprisingly straight-forward manner. It has been found, according to the process of the present invention, that a diester of dithiophosphoric acid having ester groups derived from the same low molecular weight alcohol can be transesterified with a less volatile, monohydric or polyhydric, primary or secondary aliphatic or araliphatic alcohol.

That the desired reaction is obtained is quite unexpected. As is generally known, the reaction between an alcohol and an acidic grouping (—SH) in a diester of a dithiophosphoric acid would be expected to produce a neutral tri-ester as a principal product. In the process of the invention, contrary to expectations, a mixed diester of dithiophosphoric acid containing dissimilar ester groupings is obtained. Not only is a mixed diester produced, but it is the principal product. Production of the tri-ester, if any, is small.

The process of the present invention is widely applicable. The transesterification involves a reaction between a diester of dithiophosphoric acid having the same ester grouping and either a monohydric or polyhydric, primary or secondary alcohol. The latter transesterifying alcohol is characterized as being less volatile than the alcohol resulting from the transesterification reaction. Usually, equivalent amounts of either the monohydric or polyhydric alcohol are advantageously reacted with the diester of the dithiophosphoric acid at temperatures of about 40° C. up to about 110° C., and preferably within the temperature range of between 60° C. and 90° C. The transesterification reaction is usually carried out under subatmospheric pressure, and preferably below about 25 mm. Hg pressure toward the end of the reaction. The latter is forced to completion by removal of the resultant more volatile alcohol.

As the lower aliphatic diester of dithiophosphoric acid having the same ester groups of from 1 to 6 carbon atoms which may be reacted in accordance with the process of the present invention include as illustrative the following:

O,O-dimethyl dithiophosphoric acid
O,O-diethyl dithiophosphoric acid
O,O-dipropyl dithiophosphoric acid
O,O-dibutyl dithiophosphoric acid
O,O-di-(1,3-dimethylbutyl) dithiophosphoric acid
O,O-dihexyl dithiophosphoric acid The alkyl group may be either straight or branched chain and either can advantageously be so-employed.

Any of a large variety of primary or secondary aliphatic and araliphatic alcohols can be employed as the transesterification reagent. Included are several diverse monohydric and polyhydric alcohols. It is of prime import, however, to select a transesterification reagent which is less volatile than the alcohol which is released during transesterification. Otherwise, the reaction whereby transesterification is affected will be incomplete. To insure reaction, a monohydric alcohol containing at least seven carbon atoms is provided so that it does not distill from the reaction mixture under the conditions of reaction. However, sufficiently low volatility is provided with the utilization of polyhydric alcohols of substantially less than 7 carbon atoms, because under the conditions of reaction a polyhydric alcohol is rendered substantially non-volatile when only one of the hydroxyl groups of a polyhydric alcohol has reacted with the dithiophosphoric acid diester.

Illustrative aliphatic or araliphatic monohydric alcohols containing 7–30 carbon atoms which contain hydrocarbon radicals or hydrocarbon radicals interrupted by at least one ether linkage include the following alcohols:

n-Heptanol
3-heptanol
Octyl alcohol
Lauryl alcohol
Oleyl alcohol
Linoleyl alcohol 2-phenylethanol
Phenoxyethanol
Triethylene glycol monomethyl ether
Butoxy ethoxy propanol
Hexaethylene glycol monooctadecyl ether
Diethylene glycol n-hexyl ether Illustrative polyhydric alcohols containing from 2 to 4 hydroxyl groups, which also may contain an ether linkage, include:

Ethylene glycol
Diethylene glycol
Propylene glycol
Polypropylene glycol
2,2-diethyl-1,3-propanediol
2-ethyl-2-butyl-1,3-propanediol
Glycerol
Hexane-1,2,6-triol
Pentaerythritol Advantageously, it has been found that under preferred conditions of reaction, the transesterification reaction usually proceeds with loss of less than about 10% of the acidity of the original lower aliphatic diester of the dithiophosphoric acid, as shown by a potentiometric titration of the product after reaction. This demonstrates that either decomposition or the formation of triester is negligible. It has also been found that rearrangement to diesters of the type:

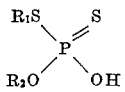

in which $R_1$ and $R_2$ are defined in Formula 1 above is also negligible. The absence of any rearrangement can be readily demonstrated by use of an analytical technique described in the Journal of Agricultural and Food Chemistry, volume 4, No. 1, at pages 42–49 (January 1956). This technique involves the oxidation of a sample with 12 N nitric acid. Sulfur in the dithio grouping

is oxidized completely to sulfate under the stated conditions. All the sulfur can be determined as barium sulfate, whereas if a group

is present, the sulfur in the —$SR_1$ radical will not so oxidize. In the transesterification products produced according to the present invention, substantially complete oxidation of the sulfur occurs.

The following examples are presented to facilitate a further understanding of the present invention. It is intended, however, that the invention is not to be construed as being limited thereto. Unless otherwise stated, the parts given are by weight.

Example 1

202.5 parts of distilled O,O-diethyldithiophosphoric acid (1 equivalent) are heated in a suitable glass vessel at 15 mm. Hg pressure with 186 parts (1 equivalent) of lauryl alcohol. A slightly exothermic reaction began at about 45° C. and boiling became much less vigorous after 50 minutes with a maximum temperature of 71° C. During reaction, 42.8 parts of ethanol as distillate are collected in a Dry Ice trap. A substantially theoretical yield of colorless O-ethyl-O-lauryl dithiophosphoric acid is obtained. Upon analysis, 99.2% of the original acidity of the diethyldithiophosphoric acid is found to be retained, showing the almost complete absence of tri-ester formation or of decomposition.

In a similar run, two moles stearyl alcohol were substituted for the lauryl alcohol of Example 1, with the intention of replacing both ethyl groups of the diethyldithiophosphoric acid. The weight of ethanol caught in a Dry Ice trap between the reaction vessel and the vacuum source agreed closely with the loss in weight of the reaction mixture and with the theoretical loss in weight for replacement of only one ethyl radical. The reaction could not be forced beyond this point. This run demonstrates that the transesterification reaction product herein is actually the mixed ester, and not the mixture which results from the reaction of different alcohols with phosphorous pentasulfide.

Example 2

In a suitable reaction vessel 335 parts O,O-di-(1,3-dimethylbutyl)-dithiophosphoric acid and 262 parts commercial oleyl alcohol are heated 137 minutes at 5 mm. Hg pressure to a final temperature of 80° C. The O-(1,3-dimethylbutyl)-O-oleyl-dithiophosphoric acid product, 490 parts by weight, contains 94.0% of the original acidity.

Example 3

Into a suitable vessel is charged 202.5 parts of distilled O,O-diethyldithiophosphoric acid together with 264 parts of nonylphenoxyethanol. The reaction vessel is heated under vacuum. A slightly exothermic reaction begins at about 45° C. and after about 3 hours at a maximum temperature of 103° C. boiling becomes much less vigorous while distilling ethanol. Heating is then terminated and the contents withdrawn and cooled to room temperature. A good yield of O-ethyl-O-(nonylphenoxyethyl)-dithiophosphoric acid is obtained. By analysis, 89.3% of the original acidity of the diethyldithiophosphoric acid is found to be retained. This slightly low value shows that with prolonged heating close to the upper temperature limit of the process of this invention a tri-ester is just beginning to form.

Example 4

Into a suitable vessel 203 parts of O,O-diethyldithiophosphoric acid and 116 parts of commercial 3-heptanol are charged and heated to a final temperature of 71° C. at 15 mm. Hg pressure. Recovered O-ethyl-O-(1-ethylpentyl)-dithiophosphoric acid product in good yield and purity contains 97.6% of the original acidity.

Example 5

Repeating the procedure of Example 1, two equivalents of diethyldithiophosphoric acid and one mole of 2-ethyl-2-butyl-1,3-propanediol are charged to a suitably equipped vessel and the contents therein are heated to a maximum temperature of 77° C. while distilling off ethanol under reduced pressure. A substituted dithiophosphoric acid in good yield and purity is recovered which is characterized by the formula:

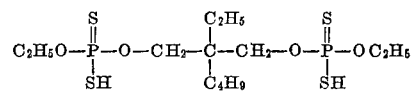

The so-recovered dithiophosphoric acid contains 94.3% of the original acidity.

Example 6

Substituting hexane-1,2,6-triol in the procedure of Example 5, a good yield of colorless dithiophosphoric acid ester is recovered which corresponds to the formula:

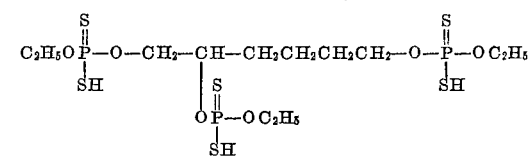

Upon analysis, 92.7% of the original acidity of the dithiophosphoric acid is found.

Mixed diesters of dithiophosphoric acids produced according to the process of the present invention are useful in many ways. Not the least of these is in the field of mineral dressing wherein the products are useful as anionic collecting agents and promoters, particularly for non-ferrous metal sulfide minerals.

A number of particularly useful compounds in this field which are within the scope of Formula 2 above are believed to be new and novel. They are derivatives of polypropylene glycols and are represented by the general formula:

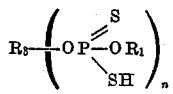

where $R_1$ is an alkyl from 1–6 carbon atoms, "$n$" is two and $R_3$ represents the grouping:

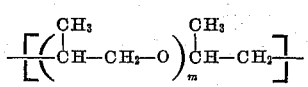

in which "$m$" is a whole number from 1 to 39, inclusive.

In general, these are derivatives of polypropoxy alcohols of the type:

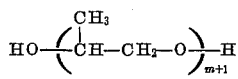

where "$m$" is an integer from 1 to 39, and are usually obtained as fractions from the distillation of the product obtained when reacting one mole of propylene glycol with one or more moles of 1,2-propylene oxide. Since the propylene glycols are liquids at ordinary temperatures up to molecular weights of about 2500, the reaction is readily accomplished even with the higher molecular weight compounds. Thus, one mole of the latter propylene glycol will react with two moles of the diester dithiophosphoric acid according to the process of the invention.

It is to be understood that the structure of the polypropylene glycols is not altogether certain or uniform. In the polypropoxy chain, the linkages:

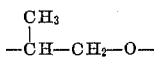

and

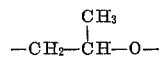

undoubtedly occur in varying proportions and both types are contemplated by the polypropoxy alcohols used above.

The following example will illustrate the reaction between a polypropylene glycol and a diester of a dithiophosphoric acid.

*Example 7*

Into a suitable glass vessel equipped with stirrer is charged a mixture of one equivalent of O,O-diethyl dithiophosphoric acid and one equivalent of polypropylene glycol whose average molecular weight is 425. The mixture is heated at a maximum temperature of 82° C. for about 55 minutes with a final pressure of 10 mm. Hg. Ethanol is permitted to distill off and is collected in a Dry Ice trap. A good yield of a colorless dithiophosphoric acid is recovered. The latter, which retains 98.4% of the original acidity corresponds to the formula:

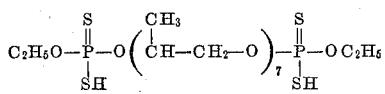

Polypropylene glycols of average molecular weight ranging from about 134 to 2500 are employed as transesterifying agents with corresponding similar beneficial results as illustrated in Example 7.

To illustrate the use of the transesterified products as flotation reagents made by the process of the present invention, the product of Example 7 will be taken as illustrative.

*Example 8*

A charge of Mascot zinc ore assaying 6.51% Zn was wet-ground and transferred to a Fagergren flotation machine as a slurry containing 25% solids. To the slurry is added 0.12 pound of pine oil, 0.5 pound copper sulfate and 0.05 pound of polypropylene glycol bis-(ethyl dithiophosphoric acid) as prepared in accordance with Example 7. Reagent quantities are expressed per ton of ore charge. After agitating and aerating for 4 minutes, 98% of the zinc is recovered in a rougher concentrate assaying 55.96% Zn.

In addition to the hereinbefore stated utility, the transesterified products of the present invention find utility as lubricating oil additives (especially as the Zn and Ba salts) and as chemical intermediates in organic synthesis. In the latter connection, it is an important advantage of the invention that if a clear water-white alcohol and a clear water-white dialkyldithiophosphoric acid are transesterified in a glass vessel, the transesterified product is a clear water-white liquid. Heretofore, by the reaction of $P_2S_5$ with a mixture of alcohols, highly discolored products are obtained, which usually are undistillable and excessively difficult to purify.

I claim:

1. A process for the preparation of diesters of dithiophosphoric acid corresponding to a general formula selected from the group consisting of:

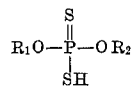

and

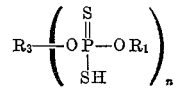

in which $R_1$ is an alkyl radical containing 1 to 6 carbon atoms, $R_2$ is a radical containing 7 to 30 carbon atoms selected from the group consisting of an aliphatic residue derived from a monohydric aliphatic alcohol and a phenylaliphatic residue derived from a monohydric phenylaliphatic alcohol, $R_3$ is a radical derived from a polyhydric aliphatic alcohol containing $n$ hydroxyl groups and selected from the group consisting of a polyhydric alkylene radical and a polyhydric alkylene radical with oxygen atoms interrupting the carbon chain and in which $n$ is a whole number from 2 to 4, inclusive, which comprises: bringing into reactive combination at temperatures between 40° C. and 110° C. a diester of dithiophosphoric acid of the general formula:

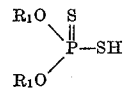

in which $R_1$ has the above-defined meaning, with a transesterifying alcohol selected from the group consisting of a monohydric aliphatic alcohol of 7 to 30 carbon atoms, a monohydric phenylaliphatic alcohol of 7 to 30 carbon atoms, and a polyhydric aliphatic alcohol containing of from 2 to 4 hydroxyl groups, said alcohol being selected from the group consisting of a polyhydric alkylene radical and a polyhydric alkylene radical with oxygen atoms interrupting the carbon chain; distilling off the resulting alcohol as formed under reduced pressure, and recovering the corresponding substantially transesterified compound as a principal product in the residue.

2. A process according to claim 1 in which $R_1$ is ethyl.

3. A process according to claim 1 in which the transesterifying alcohol is lauryl alcohol.

4. A process according to claim 1 in which the transesterifying alcohol is oleyl alcohol.

5. A process according to claim 1 in which the transesterifying alcohol is nonylphenoxyethanol.

6. A process according to claim 1 in which the transesterifying alcohol is 3-heptanol.

7. A process according to claim 1 in which the transesterifying alcohol is polypropylene glycol having an average molecular weight in the range from about 134 to 2500.

8. The compound which is represented by the general formula:

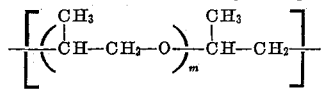

in which $R_1$ is an alkyl radical from 1 to 6 carbon atoms; and $R_3$ is a radical characterized by the grouping:

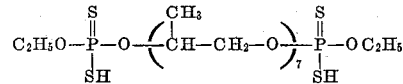

wherein $m$ is a whole number from 1 to 39 inclusive.

9. The compound represented by the general formula:

$$C_2H_5O-\underset{\underset{SH}{|}}{\overset{\overset{S}{\|}}{P}}-O-\left(\overset{CH_3}{\underset{|}{C}}H-CH_2-O\right)_7-\underset{\underset{SH}{|}}{\overset{\overset{S}{\|}}{P}}-OC_2H_5$$

References Cited in the file of this patent

UNITED STATES PATENTS 2,063,629     Salzberg et al. _____ Dec. 8, 1936

OTHER REFERENCES

Rueggeberg et al.: "Jour. Am. Chem. Soc.," vol. 70, pp. 1802–1804 (1948).

Kosolapoff: "Jour. Am. Chem. Soc.," vol. 73, p. 4989 (1951).